United States Patent [19]

Byers

[11] Patent Number: 4,671,130

[45] Date of Patent: Jun. 9, 1987

[54] DRIVE ASSEMBLY FOR ASTRONOMICAL TELESCOPE

[76] Inventor: Edward R. Byers, 29001 W. Highway 58, Barstow, Calif. 92311

[21] Appl. No.: 807,320

[22] Filed: Dec. 10, 1985

[51] Int. Cl.[4] .............................................. F16H 1/16
[52] U.S. Cl. ...................................... 74/425; 74/625; 350/568; 384/547
[58] Field of Search ...................... 74/425, 424.5, 625; 350/568, 567; 464/45; 384/490, 543, 546, 547, 299; 353/3; 126/424; 248/183, 184, 278

[56] References Cited

U.S. PATENT DOCUMENTS

| | | | |
|---|---|---|---|
| 836,771 | 11/1906 | Lohmann | 350/568 |
| 2,693,032 | 11/1954 | Braymer | 350/567 X |
| 2,863,701 | 12/1958 | Jones et al. | 384/547 X |
| 2,881,629 | 4/1959 | Homier | 74/425 |
| 3,122,384 | 2/1964 | Luenberger | 384/299 X |
| 3,885,858 | 5/1975 | Hildemann | 350/568 |
| 3,951,511 | 4/1976 | Parsons | 350/568 |
| 3,959,151 | 5/1976 | Liebowitz | 74/425 X |
| 4,044,868 | 8/1977 | Berger | 464/45 X |
| 4,145,093 | 3/1979 | Sekerich | 384/547 X |
| 4,202,321 | 5/1980 | Volna | 353/3 X |
| 4,227,513 | 10/1980 | Blake et al. | 353/3 X |
| 4,400,066 | 8/1983 | Byers | 350/568 |
| 4,541,294 | 9/1985 | Byers | 74/425 X |
| 4,571,227 | 2/1986 | Colanzi et al. | 384/547 X |

FOREIGN PATENT DOCUMENTS 994150 6/1965 United Kingdom ............... 350/568

Primary Examiner—Lawrence Staab
Assistant Examiner—Dwight Diehl
Attorney, Agent, or Firm—Keith D. Beecher

[57] ABSTRACT

A sidereal-rate drive assembly for an astronomical telescope which includes a worm gear for rotating the telescope about its polar axis and which is engaged by a motor driven worm. The worm gear fits over the end of a polar shaft, and it and the end of the polar housing are grooved to form ball bearing races. A plurality of balls are placed in the races to constitute a ball bearing so that the worm gear may be freely rotatable on the polar housing about the polar axis. The telescope mount includes a polar shaft which extends through the worm gear into the polar housing along the polar axis. The worm gear is frictionally coupled to the polar shaft through a sleeve composed of nylon or other appropriate material, and through a fiber washer, or the like. The weight of the telescope provides a desired friction force to enable the worm gear to turn the telescope mount about the polar axis. However, the telescope mount may be turned by hand relative to the worm gear about the polar axis to be set to any desired angular position.

6 Claims, 2 Drawing Figures

DRIVE ASSEMBLY FOR ASTRONOMICAL TELESCOPE

BACKGROUND OF THE INVENTION

There are many instances in the use of telescopes in which it is necessary or desirable to rotate the telescope about its polar axis. For example, because of the rotation of the earth, an astronomical telescope must be rotated about its polar axis at a constant rate of one revolution per day when making long time studies and photographs of cellestial bodies.

A variety of mounting systems for astronomical telescopes have been devised. One of the most common astronomical telescope mounting systems is known as the equatorial mount. The equatorial mount embodies a two-axes gimbal system having an inclined rotation axis which parallels the earth's rotational axis, and having a second horizontal rotational axis which intersects the inclined axis at right angles to the vertical plane containing the latter axis. The inclined axis is referred to as the polar axis of the telescope, and the perpendicular axis is referred to as the declination axis. When the polar axis is adjusted to be parallel to the earth's axis, the elevation angle of the telescope will correspond to the latitude at which the telescope is used. Rotation of the mounting unit about the polar axis moves the telescope in a rotary tracking motion as explained above.

SUMMARY OF THE INVENTION

An improved, simple, compact and inexpensive astronomical telescope drive assembly is provided by which the astronomical telescope is rotated with extreme accuracy about its polar axis at a desired rate by a worm gear which forms its own bearing with the polar axis of the telescope base. This eliminates the need for expensive self-contained bearings which operate independently of the gear. The assembly also forms its own friction clutch with the polar drive shaft of the telescope mount, so as to obviate the need for expensive friction clutches.

DETAILED DESCRIPTION OF THE ILLUSTRATED EMBODIMENT

Figure 1:
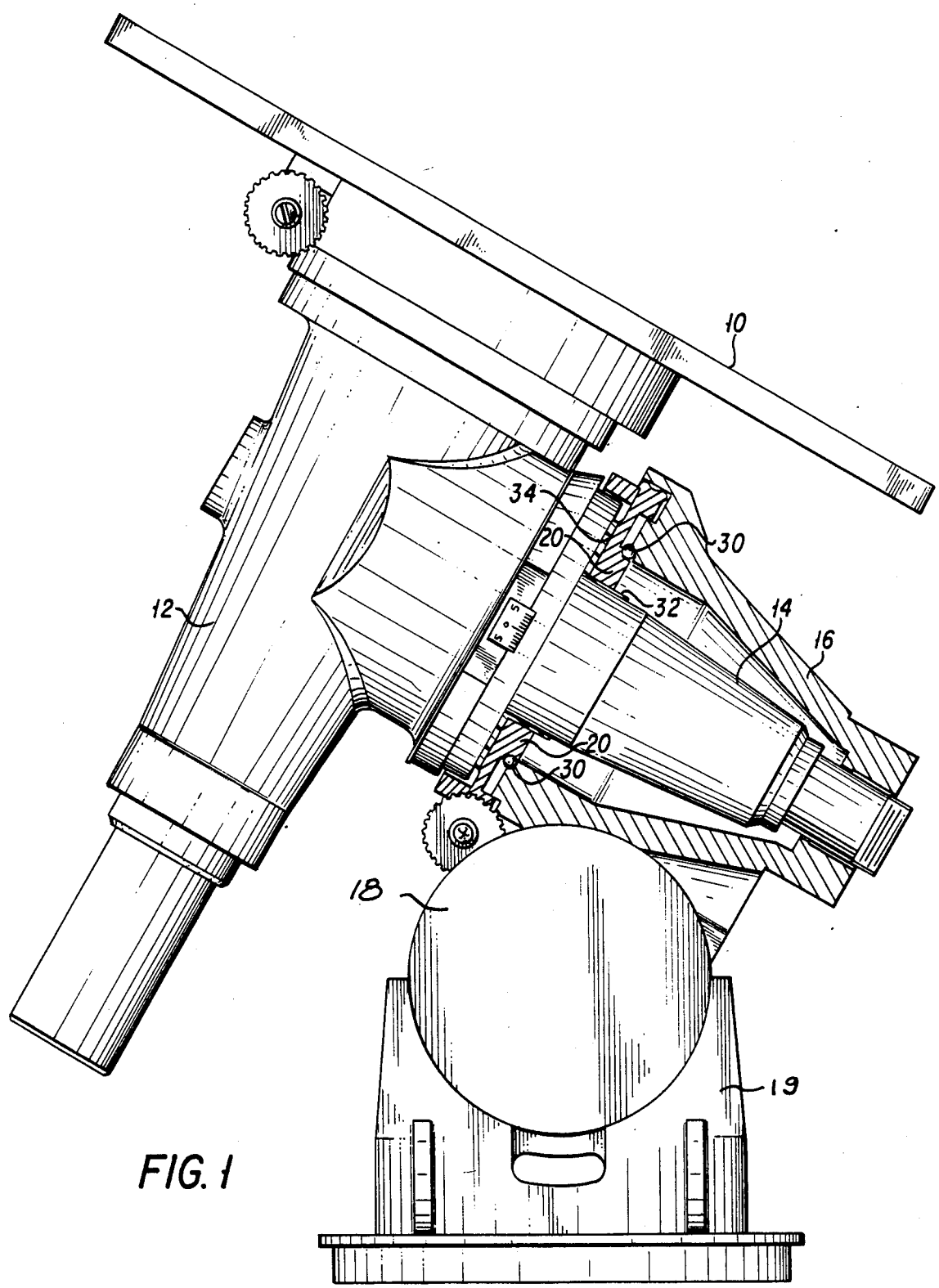
FIG. 1 is a side view, partly in section, of an equatorial platform-type of astronomical telescope mount which is driven about the polar axis by the drive assembly of the present invention illustrated in one of its embodiments.

The equatorial mounting for an astronomical telescope shown in FIG. 1 includes a tracking platform 10 on which the telescope is mounted, and which, in turn, is mounted on a declination casting 12. The declination casting 12 includes a polar shaft 14 which extends into a polar housing 16. The polar housing 16, like the declination casting 12 may be, for example, an aluminum casting. The polar housing 16 is supported by an inclination control unit 18 on a base 19.

Figure 2:
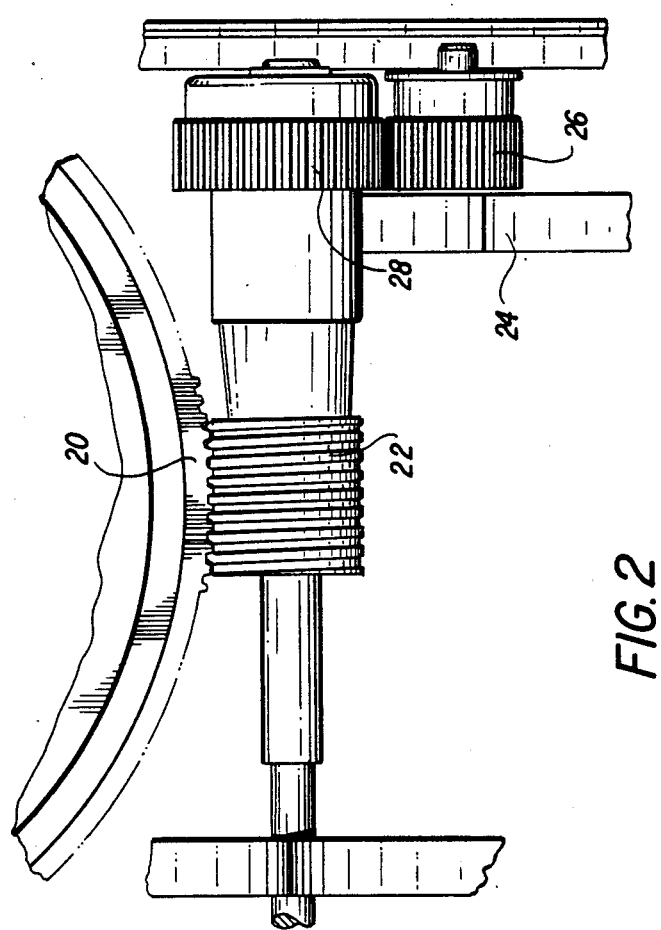
FIG. 2 is a detailed view showing the manner in which a worm and worm gear included in the drive assembly of FIG. 1 engage one another in the practice of the invention.

The present invention is concerned with a drive assembly for turning the polar shaft 14 within the housing 16 about the polar axis. As shown, the upper end of the housing 16 is configured to receive a worm gear 20 which also may be aluminum, or other suitable material. Worm gear 20 is mounted coaxially with the polar axis, and polar shaft 14 extends along the polar axis through the worm gear into polar housing 16. The worm gear 20 is driven by a drive worm 22, which is shown in more detail in FIG. 2. As shown in FIG. 2, a drive motor 24 is coupled to worm gear 22 through gears 26 and 28.

The worm gear 20 and the end of the polar housing 16 are grooved, as shown, to form ball bearing races, and a plurality of bearing balls 30 are mounted within the races, so that the worm gear and the end of the polar housing form their own ball bearing, to enable the worm gear to be freely rotatable on the housing about the polar axis.

A sleeve 32 formed of nylon, or other suitable material, is inserted between the polar shaft 14 and the bore of the worm gear 20, and a fiber washer 34 is inserted between a shoulder of shaft 14 and the worm gear. The nylon sleeve and the fiber washer cooperate to form a friction clutch between the worm gear and the shaft 14, and the weight of the declination casting 12 and the telescope itself provides the desired friction force, so that the worm gear may drive the assembly about the polar axis. However, the assembly may be turned by hand about the polar axis causing slippage between the polar shaft 14 and the worm gear 20.

The invention provides, therefore, a simple and inexpensive drive assembly for the telescope mount, in which the worm gear forms its own ball bearing and its own friction clutch.

It will be appreciated that while a particular embodiment of the invention has been shown and described, modifications may be made. It is intended in the claims to cover all modifications which come within the true spirit and scope of the invention.

I claim:

1. A drive assembly for turning an astronomical telescope about a polar axis comprising: a base; a housing mounted on said base coaxial with said polar axis; a gear mounted on one end of said housing for rotation about the polar axis; said gear and said housing being grooved to provide ball bearing races therebetween; a plurality of bearing elements contained in said races; a mounting for the telescope supported on said gear in frictional relationship therewith, said mounting including a polar shaft extending coaxially through said gear and into said housing along the polar axis; and drive means for rotating said gear about said polar axis.

2. The drive assembly defined in claim 1, in which said bearing elements are in the form of balls.

3. The drive assembly defined in claim 1, in which said drive means includes a worm coupled to said gear for rotating said gear about the polar axis.

4. The drive assembly defined in claim 1, in which said polar shaft includes an integral shoulder adjacent to said worm gear in facing relationship therewith, and which includes a washer composed of fibrous material interposed between the gear and said shoulder coaxially with said shaft to provide said frictional relationship.

5. The drive assembly defined in claim 1, and which includes a sleeve interposed between the shaft and the gear coaxial with the polar axis.

6. The drive assembly defined in claim 5, in which said sleeve is composed of nylon.

* * * * *